US012139944B2

(12) United States Patent
Gullin

(10) Patent No.: US 12,139,944 B2
(45) Date of Patent: Nov. 12, 2024

(54) CORNER BRACKET

(71) Applicant: Assa Abloy Entrance Systems AB, Landskrona (SE)

(72) Inventor: Jesper Gullin, Akarp (SE)

(73) Assignee: Assa Abloy Entrance Systems AB, Landskrona (SE)

(*) Notice: Subject to any disclaimer, the term of this patent is extended or adjusted under 35 U.S.C. 154(b) by 0 days.

(21) Appl. No.: 17/774,548

(22) PCT Filed: Nov. 17, 2020

(86) PCT No.: PCT/EP2020/082404
§ 371 (c)(1),
(2) Date: May 5, 2022

(87) PCT Pub. No.: WO2021/099316
PCT Pub. Date: May 27, 2021

(65) Prior Publication Data

US 2022/0389742 A1 Dec. 8, 2022

(30) Foreign Application Priority Data

Nov. 20, 2019 (SE) .................................... 1930379-1

(51) Int. Cl.
*E05D 13/00* (2006.01)
*E05F 15/686* (2015.01)

(52) U.S. Cl.
CPC .......... *E05D 13/006* (2013.01); *E05F 15/686* (2015.01); *E05Y 2400/445* (2013.01); *E05Y 2400/552* (2013.01); *E05Y 2600/626* (2013.01)

(58) Field of Classification Search
CPC . E05D 13/006; E05F 15/686; E05Y 2600/626
See application file for complete search history.

(56) References Cited

U.S. PATENT DOCUMENTS 4,368,770 A * 1/1983 Ulfhielm ............... E06B 9/0653 160/84.02
6,279,268 B1 * 8/2001 Beaudoin .............. E05D 13/006 160/193
2020/0024899 A1 * 1/2020 Vogel .................. G01P 15/0922

FOREIGN PATENT DOCUMENTS

DE 2917023 11/1980
DE 2917023 A1 * 11/1980 ........... E05D 13/006
(Continued)

OTHER PUBLICATIONS

International Search Report and Written Opinion in PCT/EP2019/082404, mailed Feb. 15, 2021.
(Continued)

*Primary Examiner* — Daniel J Troy
*Assistant Examiner* — Daniel Alvarez
(74) *Attorney, Agent, or Firm* — Wissing Miller LLP

(57) ABSTRACT

The disclosure relates to a corner bracket (14, 16) for a vertical moving door (2), the corner bracket (14, 16) comprising: a base plate (32) configured to be attached to the door (2); and a guide path (34) for a lift cable (4, 6) arranged in the base plate (32). A switch (28) is arranged in the base plate (32) and configured to be actuated by the lift cable (4, 6) in the event of a breakage of the lift cable (4, 6). The disclosure further relates to a method, performed by a control device (200), for stopping a vertical moving door (2) of a vertical moving door system (100), the vertical moving door system (100).

13 Claims, 8 Drawing Sheets

(56) References Cited

FOREIGN PATENT DOCUMENTS

| | | | | |
|---|---|---|---|---|
| EP | 0149692 | * | 7/1985 | ........... E05D 13/006 |
| EP | 0393489 | | 10/1990 | |
| EP | 0721043 | | 7/1996 | |
| EP | 2333230 | | 6/2011 | |
| EP | 2835480 | | 2/2015 | |
| WO | 200057011 | | 9/2000 | |

OTHER PUBLICATIONS

Swedish Search Report in 1930379-1 mailed Nov. 20, 2019.
Chinese Office Action for 2020800809471 dated May 30, 2024.

* cited by examiner

CORNER BRACKET

This application is a 371 of PCT/EP2020/082404, filed on Nov. 17, 2020, published on May 27, 2021 under publication number WO 2021/099316, which claims priority benefits from Swedish Patent Application No. 1930379-1, filed on Nov. 20, 2019, the disclosure of which is incorporated herein by reference.

FIELD OF THE INVENTION

The present invention relates to vertical moving doors. More specifically, the disclosure relates to a corner bracket as defined in the introductory part of claim 1 and to a vertical moving door system as defined in the introductory part of claim 7. The disclosure also relates to a method, performed by a control device, for stopping a vertical moving door of a vertical moving door system as defined in the introductory part of claim 11. Further, the disclosure relates to a computer program and to a computer-readable medium.

BACKGROUND ART

A corner bracket is adapted to be attached to a vertical moving door and is used to interact with a lift cable for the door. One corner bracket may be attached at one side of the door and another corner bracket may be attached at the other side of the door. The lift cables interact with each corner bracket and when applying a traction force in the lift cables, the door will move in the vertical direction.

Cable brake devices are used to brake and stop the movement of a vertical moving door in the event of that the lift cable for moving the vertical moving door breaks or snaps. The cable brake device interacts with tracks of the vertical moving door system and the cable brake device could damage the track in the event of the cable brake device being activated and brake the movement of the vertical moving door.

SUMMARY

It is an object to mitigate, alleviate or eliminate one or more of the above-identified deficiencies in the art and disadvantages singly or in any combination and solve at least the above-mentioned problem.

According to a first aspect there is provided a corner bracket for a vertical moving door, the corner bracket comprising: a base plate configured to be attached to the door; and a guide path for a lift cable arranged in the base plate; wherein: a switch is arranged in the base plate and configured to be actuated by the lift cable in the event of a breakage of the lift cable. The actuation of the switch is an indication of a lift cable break.

According to an aspect a control element is arranged in the guide path and configured to be controlled by the lift cable; and wherein: the control element is configured to be pushed by the lift cable to a first position when the lift cable extends into the guide path, the control element is configured to be released by the lift cable to a second position in the event of a breakage of the lift cable, and the control element is configured to actuate the switch when the control element has been moved to the second position. The guide path in the base plate is occupied by the lift cable when the lift cable is tensioned and works correctly. In case of a cable break, the lift cable will leave the guide path and simultaneously release the control element and thus actuate the switch.

According to an aspect the control element is a lever, comprising a leaf spring element having a spring force configured to be exceeded by a force from the lift cable when the lever is pushed to the first position. When the lift cable is tensioned and works correctly, the lift cable will abut against the leaf spring element and push the leaf spring element to the first position. As long the leaf spring element is in the first position, the switch will not be actuated.

According to an aspect the control element is a pin, comprising a helical spring element having a spring force configured to be exceeded by a force from the lift cable when the pin is pushed to the first position. As an alternative to the leaf spring element, the pin, comprising a helical spring element is configured to be pushed to the first position by the lift cable, when the lift cable is tensioned and works correctly.

According to an aspect the guide path comprises an aperture, through which aperture, the control element is configured to extend. The switch is arranged in the base plate, and the control element is configured to extend through the aperture.

According to an aspect the guide path comprises a circular extension. The circular extension of the guide path results in that the lift cable smoothly will follow the circular extension and occupy the guide path when the lift cable is tensioned and works correctly.

According to an aspect the aperture is arranged in the circular extension of the guide path. Since the lift cable smoothly will follow the circular extension of the guide path, the lift cable will abut firmly against the control element, which is configured to extend through the aperture.

According to an aspect the base plate comprising a fastener element, which is configured to attaching the lift cable to the base plate. The weight from the vertical moving door will tension the lift cable when the lift cable is attached to the base plate.

According to an aspect the switch is an electrical micro switch. The micro switch is configured to be arranged in the base plate.

According to a second aspect there is provided a vertical moving door system comprising a vertical moving door, at least two lift cables, a motor and at least two corner brackets according to the above, wherein the respective at least two lift cables are connected to the motor and to the at least two corner brackets and wherein the motor is configured to move the vertical moving door by the at least two lift cables between an open and closed position. Moving the vertical moving door from the closed to the opened position is accomplished by tensioning the lift cables by the motor and to rolling up the lift cables on cable drums. The vertical moving door will move from the opened to the closed position by rolling out the cables from the cable drums by the motor, but still keep the lift cables in a tense position. In order to relieve the motor, springs may be connected to the vertical moving door and an adjacent wall. When moving the door in the direction of the closed position, the springs may be tensioned. The switch arranged in the corner brackets is configured to be actuated by the lift cable in the event of a breakage of the lift cable. The actuation of the switch is an indication of a lift cable break.

According to an aspect the motor and the switch in each of the at least two corner brackets are connected to an electric circuit, and wherein the switch is actuated and configured to stop the motor in the event of a breakage of the lift cable, which is connected to the corner bracket comprising the actuated switch. In the event of a breakage of one of the lift cables, the other lift cable will still be tensioned and work correctly. However, the switch is actuated and configured to stop the motor in the event of a breakage of one of the lift cables. Thus, the door will stop in the event of a breakage of one of the lift cables.

According to an aspect the electric circuit comprises a control device configured to receive an input signal from the actuated switch, and wherein the control device is configured to stop the motor as a response to the received input signal from the actuated switch.

According to an aspect a first corner bracket is arranged at a first lower side part of the door, and wherein a second corner bracket is arranged at a second lower side part of the door.

According to a third aspect there is provided a method, performed by a control device, for stopping a vertical moving door of a vertical moving door system, the vertical moving door system comprising: at least two lift cables, a motor and at least two corner brackets, the at least two corner brackets each comprising: a base plate configured to be attached to the door; a guide path for a lift cable arranged in the base plate; and a switch is arranged in the base plate and configured to be actuated by the lift cable in the event of a breakage of the lift cable, wherein the respective at least two lift cables are connected to the motor and to the at least two corner brackets and wherein the motor is configured to move the vertical moving door by the at least two lift cables between an open and closed position, the method comprises the steps of: receiving a signal from the switch in the event of a breakage of the lift cable, and controlling the motor to stop the movement of the vertical moving door.

The disclosure also relates to a computer program comprising instructions which, when the program is executed by a computer, causes the computer to carry out the method disclosed above. The disclosure further relates to a computer-readable medium comprising instructions, which when executed by a computer causes the computer to carry out the method disclosed above.

A further scope of applicability of the present invention will become apparent from the detailed description given below. However, it should be understood that the detailed description and specific examples, while indicating preferred embodiments of the invention, are given by way of illustration only. Various changes and modifications within the scope of the invention will become apparent to those skilled in the art from the detailed description.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present invention will be more fully appreciated by reference to the following illustrative and non-limiting detailed description of example embodiments of the present invention, when taken in conjunction with the accompanying drawings.

Figure 11:
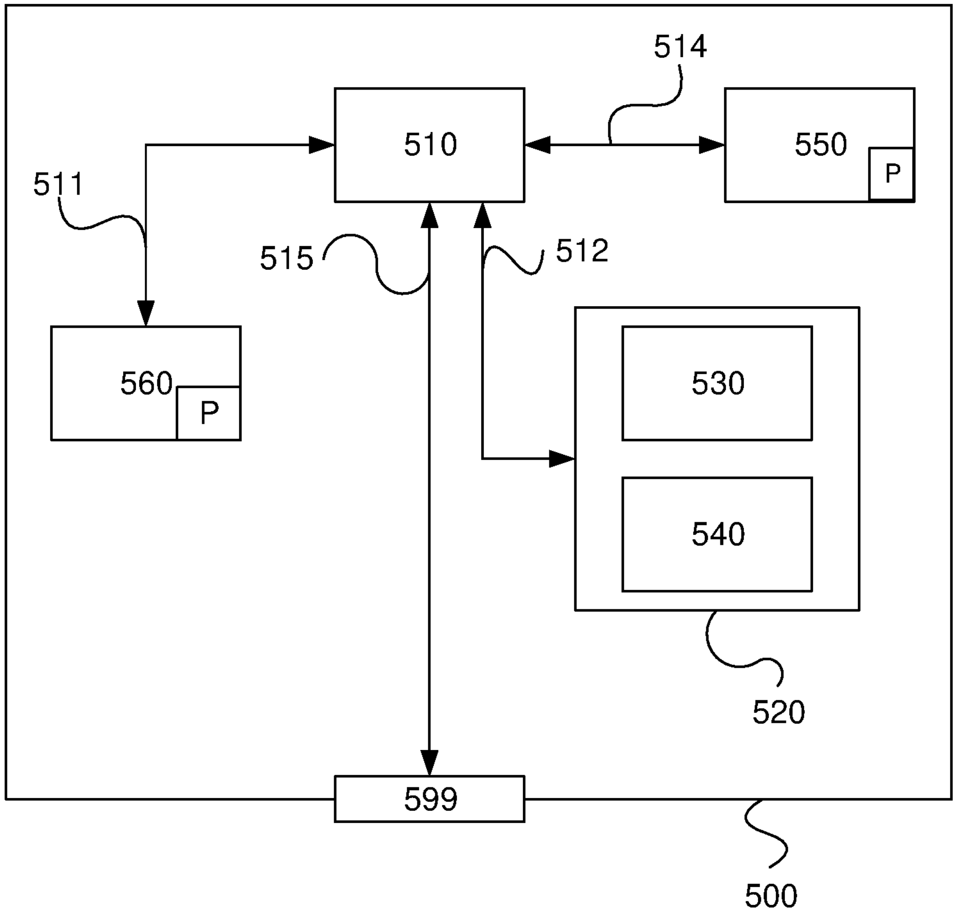

FIG. 11 schematically illustrates a control device or computer according to an example.

DETAILED DESCRIPTION

The present disclosure will now be described with reference to the accompanying drawings, in which currently preferred example aspects and embodiments of the disclosure are shown. This disclosure may, however, be embodied in many different forms and should not be construed as limited to the herein disclosed embodiments. The disclosed aspects and embodiments are provided to fully convey the scope of the disclosure to the skilled person.

Figure 1:
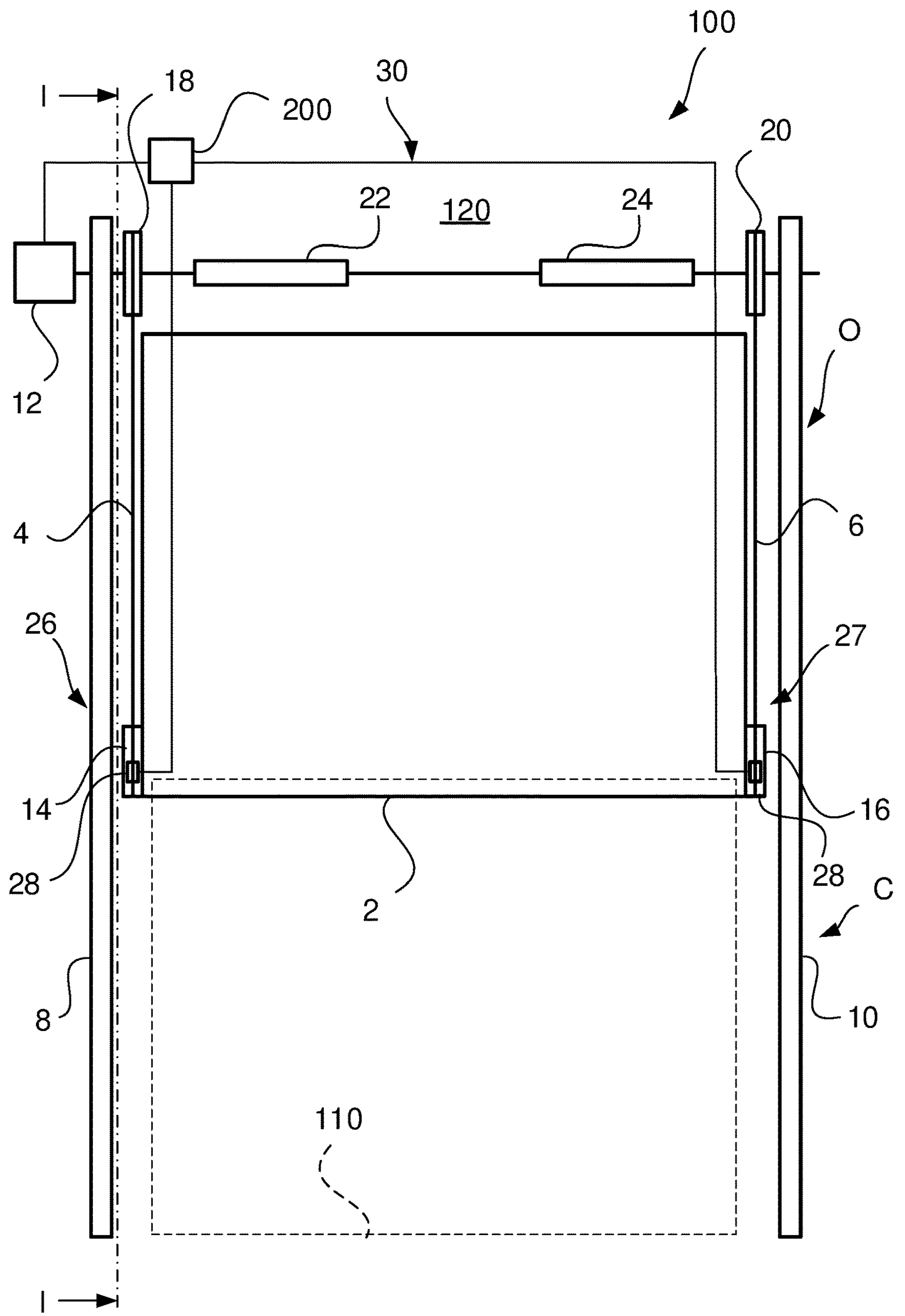
FIG. 1 shows a schematic front view of a vertical moving door system provided with corner brackets according to the invention, with a vertical moving door in an open position.

FIG. 1 shows a vertical moving door system 100. The vertical moving door system 100 comprises a vertical moving door 2, a first and a second lift cable 4, 6, a first and second track 8, 10 on each side of the door 2, a motor 12 and first and second corner brackets 14, 16 arranged on each side of the door 2.

The vertical moving door system 100 according to an aspect is an up and above vertical moving door 2, i.e. the vertical moving door 2 is moveable from a closed position C to an open position O. In the open position O the vertical moving door 2 is positioned in a substantial vertical position above an opening 110 of a wall 120.

The vertical moving door 2 is according to an aspect a single blade vertical moving door 2. However, the vertical moving door may alternatively be a sectional vertical moving door 2 comprising a number of connected sections (not shown).

The motor 12 is mounted either directly on the wall 120 or at one of the tracks 8, 10. The first and second lift cables 4, 6 is in one end connected to the motor 12 via first and second cable drums 18, 20 and in the other end connected to the vertical moving door 2 via the first and second corner brackets 14, 16. Put in another way, the first and second lift cables 4, 6 are mounted or connected to the first and second corner brackets 14, 16 and the first and second corner brackets 14, 16 are connected or mounted to the vertical moving door 2.

The motor 5 is configured to wind up and unwind the first and second lift cables 4, 6 on the first and second cable drums 18, 20 and thereby move the vertical moving door 2 between the open and closed position O, C.

The vertical moving door 2 is moveably connected to the first and second tracks 8, 10. The first and second tracks 8, 10 are mounted at the opening 110 and configured to guide the vertical moving door 2 when it is moved between the closed position C and the open position O. Put in another way, the first and second tracks 8, 10 guides the vertical moving door 2 when it is moved from the closed position C to the open position O and from the open positon O to the closed position C.

The first corner bracket 14 is arranged at a first lower side part 26 of the door 2, and the second corner bracket 16 is arranged at a second lower side part 27 of the door 2.

According to an aspect the vertical moving door system 100 may comprise two motors 12, positioned at each side of the door 2. The first and second tracks 8, 10 may be arranged on each side of the door 2 and positioned at opposite vertical edges of the opening 110. The first and second tracks 8, 10 may have a U-, C- or G-shaped cross sectional shape.

In order to relieve the motor 12, springs 22, 24 may be connected to the vertical moving door 2 and the adjacent wall 120. When moving the door 2 in the direction of the closed position C, the springs 22, 24 may be tensioned.

The vertical moving door system 100 as such are well known and will thus not be described further in detail herein.

Each of the first and second corner brackets 14, 16 comprises a switch 28, which is configured to be actuated by the lift cables 4, 6 in the event of a breakage of the lift cables 4, 6. The actuation of the switch 28 is an indication of a lift cable break.

The motor 12 and each switch 28 in the corner brackets 14, 16 are connected to an electric circuit 30. The switch 28 is actuated and configured to stop the motor 12 in the event of a breakage of one of the lift cables 4, 6 connected to the corner bracket 14, 16 comprising the actuated switch 28. In the event of a breakage of one of the lift cables 4, 6, the other lift cable 4, 6 will still be tensioned and work correctly. However, the switch 28 is actuated and configured to stop the motor 12 in the event of a breakage of one of the lift cables 4, 6. Thus, the door 2 will stop in the event of a breakage of one of the lift cables 4, 6. The electric circuit 30 comprises a control device 200 configured to receive an input signal from the actuated switch 28. Thus, the control device 200 is configured to send a signal to the motor 12 in order to stop the motor 12 as a response to the received input signal from the actuated switch 28.

Figure 2:
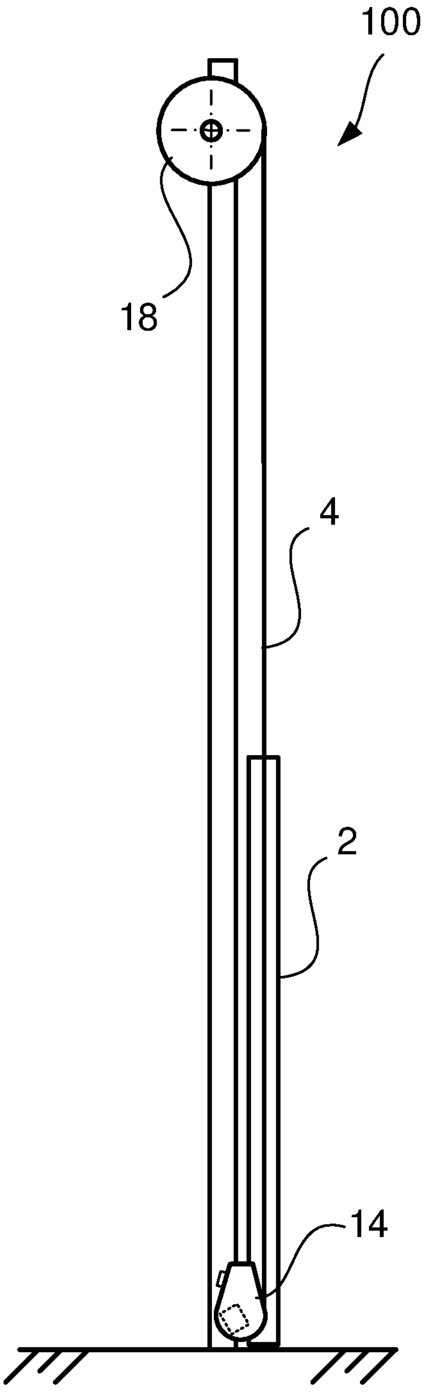
FIGS. 2 and 3 show schematic cross sectional views along line I-I in FIG. 1, with an unbroken and broken lift cable of a vertical moving door system.
Figure 3:
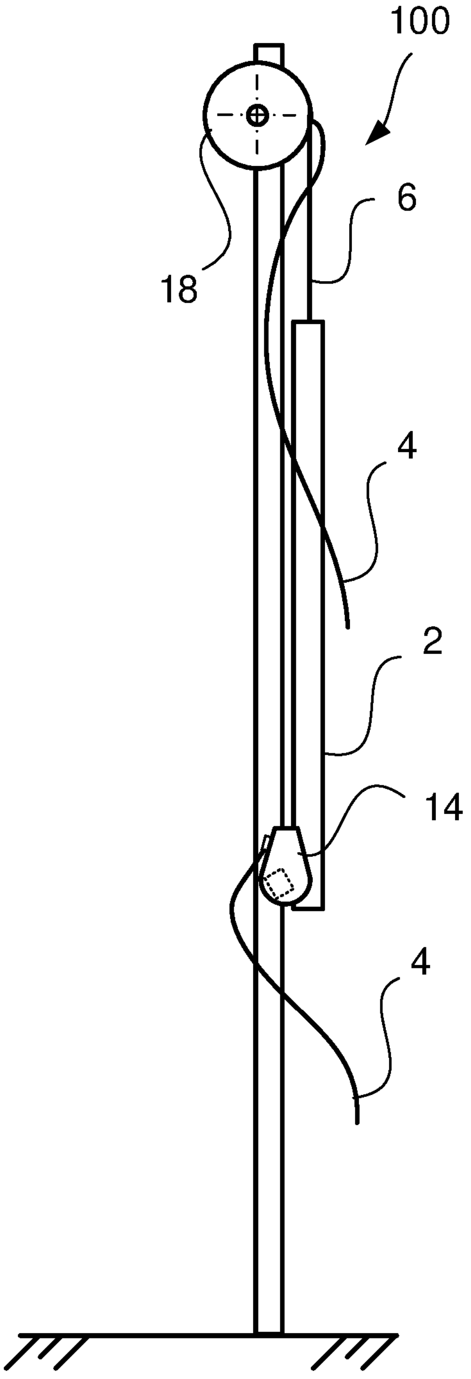

FIGS. 2 and 3 show schematic cross sectional views along line I-I in FIG. 1, with an unbroken and broken lift cable 4, 6 of a vertical moving door system 100. In FIG. 2 the door 2 is closed and the first lift cable 4 is tensioned and works correctly. The first lift cable 4 is in a first end attached to the first corner bracket 14 and in a second end connected to the first cable drum 18. In FIG. 3 the door 2 has moved vertically upwards by the first and second lift cables 14, 16. However, due to failure, the first lift cable 14 has been broken. However, the second lift cable 6 works correctly and prevents the vertical moving door 2 to fall down. In the event of that one of the lift cables 14, 16 breaks and snaps, the tension in the broken lift cable 3 rapidly will decrease as it is no longer connected to the motor 12 (FIG. 1) and the cable drum 18, 20. The first end part of the first lift cable 4 in FIG. 3 is still attached to the first corner bracket 14. However, the first end part of the first lift cable 4 is no longer tensioned and will no longer act with a force on the first corner bracket 14.

Stopping the motor 12 and the vertical moving door 2 in the event of a lift cable break will eliminate the risk of that a person or objects in the path of the vertical moving door 2 could be injured or that the vertical moving door system 100 is damaged. Stopping the door 2 in the event of a lift cable break is also an indication for service personnel to replace the broken lift cable 14, 16 with a new lift cable 14, 16.

Figure 4:
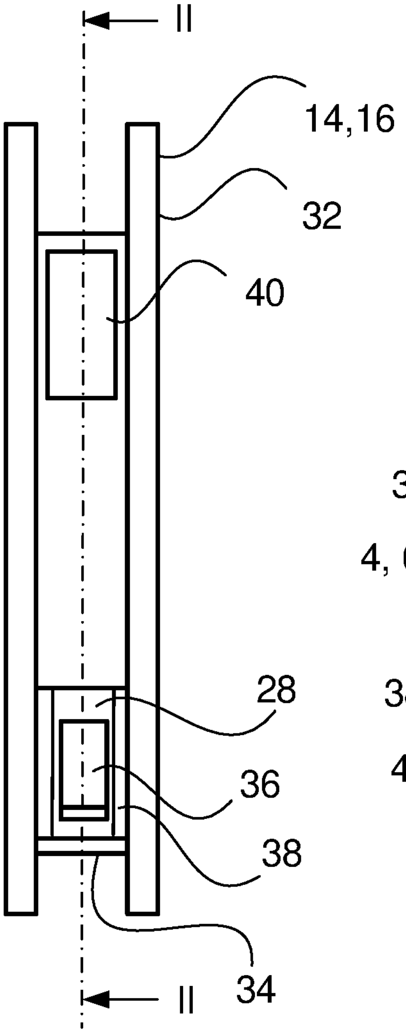
FIG. 4 shows a schematic side view of a corner bracket according to the invention.

FIG. 4 shows a schematic side view of a corner bracket 14, 16 comprising a base plate 32 configured to be attached to the door (FIG. 1) and a guide path 34 for a lift cable arranged in the base plate 32. The switch 28 is arranged in the base plate 32 and is configured to be actuated by the lift cable 4, 6 (FIG. 1) in the event of a breakage of the lift cable 4, 6. A control element 36 is arranged in the guide path 34 and is configured to be controlled by the lift cable 4, 6. The guide path 34 comprises an aperture 38, through which aperture 38, the control element 36 is configured to extend. The switch 28 is arranged in the base plate 32, and the control element 36 is configured to extend through the aperture 38. The base plate 32 comprising a fastener element 40, which is configured to attaching the lift cable 4, 6 to the base plate 32.

Figure 5:
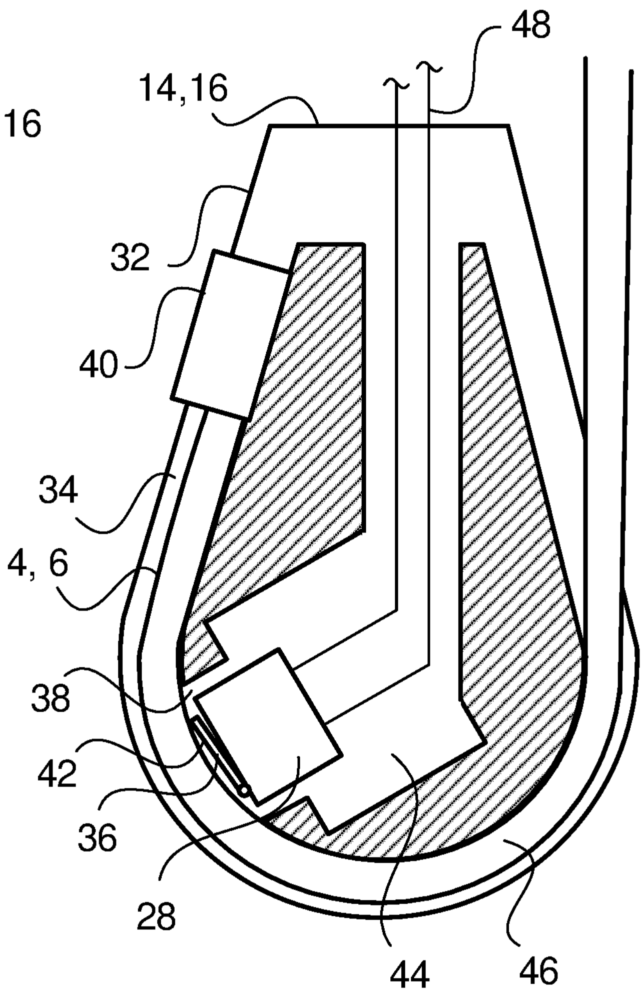
FIG. 5 shows a schematic cross sectional view along line II-II in FIG. 4, with an unbroken lift cable.
Figure 6:
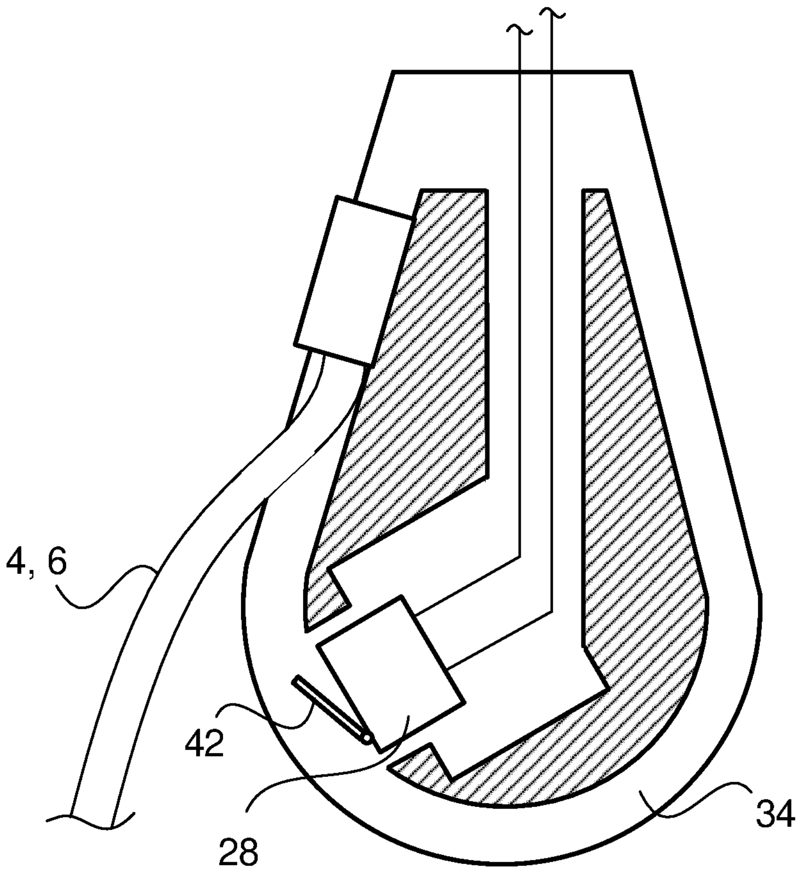
FIG. 6 shows a schematic cross sectional view along line II-II in FIG. 4, with a broken lift cable.

FIG. 5 shows a schematic cross sectional view along line II-II in FIG. 4, with an unbroken lift cable 4, 6. The lift cable 4, 6 is attached to the fastener element 40. The guide path 34 in the base plate 32 is occupied by the lift cable 4, 6 when the lift cable 4, 6 is tensioned and works correctly. The control element 36 is configured to be pushed by the lift cable 4, 6 to a first position when the lift cable 4, 6 extends into the guide path 34. The control element 36 according to FIG. 5 is a lever 36, comprising a leaf spring element 42 having a spring force configured to be exceeded by a force from the lift cable 4, 6 when the lever 36 is pushed to the first position. When the lift cable 4, 6 is tensioned and works correctly, the lift cable 4, 6 will abut against the leaf spring element 42 and push the leaf spring element 42 to the first position. As long the leaf spring element 42 is in the first position, the switch 28 will not be actuated. The switch 28 may be an electrical micro switch. The switch 28 is arranged in a space 44 of the base plate 32 and adjacent to the aperture 38 in the guide path 34. The guide path 34 comprises a circular extension 46. As shown in FIGS. 5 and 6, circular extension 46 extends along a periphery of base plate 32 along a semicircular arc. The circular extension 46 of the guide path 34 results in that the lift cable 4, 6 smoothly will follow the circular extension 46 and occupy the guide path 34 when the lift cable 4, 6 is tensioned and works correctly. The aperture 38, switch 28, and control element 36 are arranged radially inward of the circular extension 46 of the guide path 34. Since the lift cable 4, 6 smoothly will follow the circular extension 46 of the guide path 34, the lift cable 4, 6 will abut firmly against the control element 36, which is configured to extend through the aperture 38. Signal cables 48 of the circuit 30 are connected to the switch 28.

FIG. 6 shows a schematic cross sectional view along line II-II in FIG. 4, with a broken lift cable 4, 6. The leaf spring element 42 has been released by the lift cable 4, 6 to a second position in the event of a breakage of the lift cable 4, 6. The leaf spring element 42 is configured to actuate the switch 28 when the leaf spring element 42 has been moved to the second position. The lift cable 4, 6 have left the guide path 34 and simultaneously released the leaf spring element 42 and thus actuated the switch 28. When the switch 28 is actuated, signals to the circuit 30 are initiated for stopping the motor 12.

Figure 7:
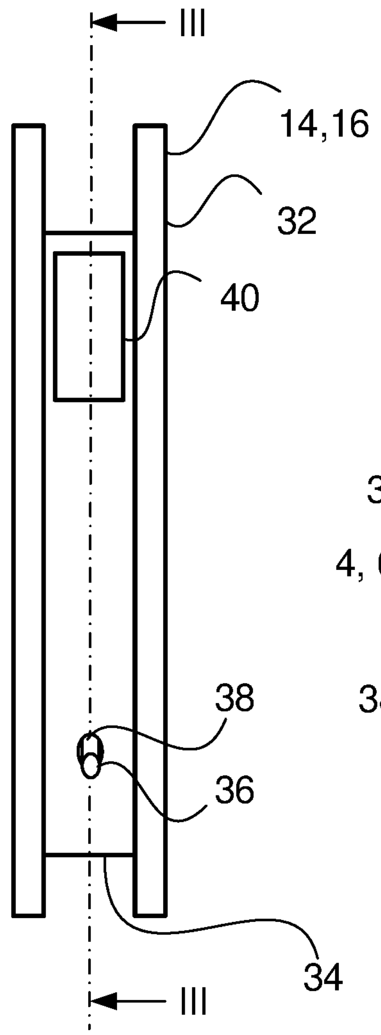
FIG. 7 shows a schematic side view of a corner bracket according to the invention.

FIG. 7 shows a schematic side view of a corner bracket 14, 16 comprising a base plate 32 configured to be attached to the door 2 (FIG. 1) and a guide path 32 for a lift cable arranged in the base plate 32. The switch 28 is arranged in the base plate 32 and is configured to be actuated by the lift cable 4, 6 (FIG. 1) in the event of a breakage of the lift cable 4, 6. A control element 36 is arranged in the guide path 34 and is configured to be controlled by the lift cable 4, 6. The guide path 34 comprises an aperture 38, through which aperture 38, the control element 36 is configured to extend. The switch 28 is arranged in the base plate 32, and the control element 36 is configured to extend through the aperture 38. The base plate 32 comprising a fastener element 40, which is configured to attaching the lift cable 4, 6 to the base plate 32.

Figure 8:
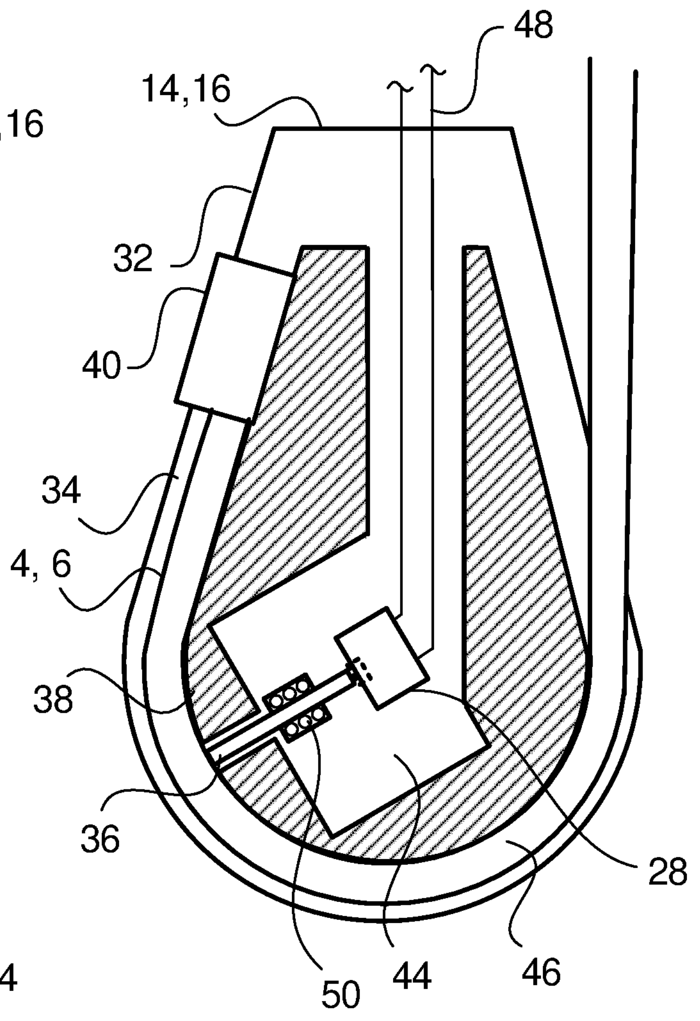
FIG. 8 shows a schematic cross sectional view along line III-III in FIG. 7, with an unbroken lift cable.
Figure 9:
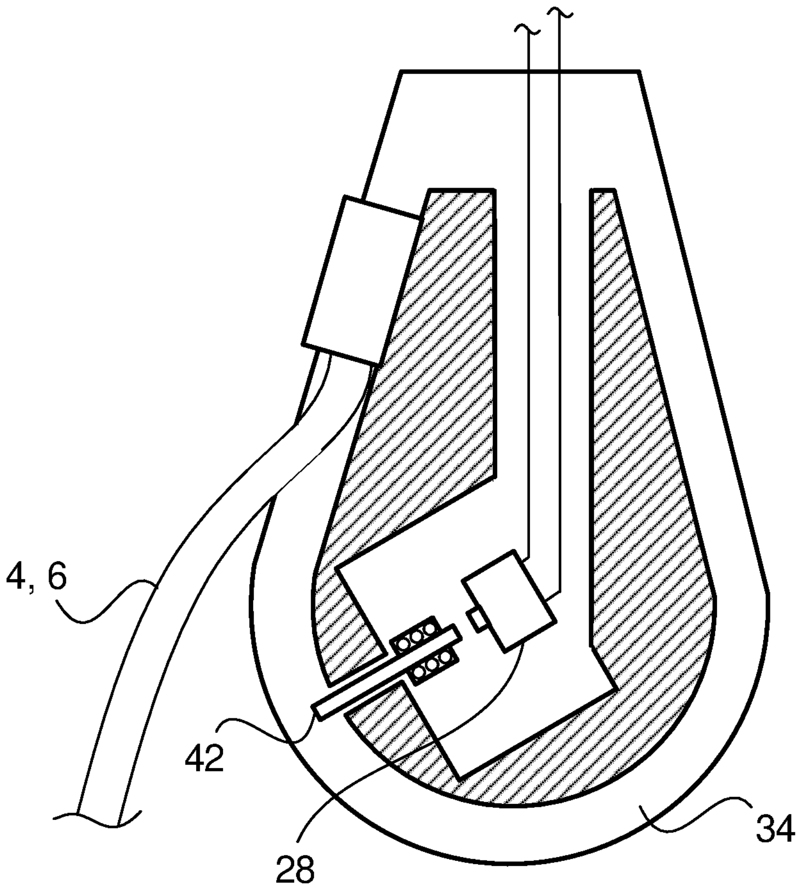
FIG. 9 shows a schematic cross sectional view along line III-III in FIG. 7, with a broken lift cable.

FIG. 8 shows a schematic cross sectional view along line III-III in FIG. 7, with an unbroken lift cable 4, 6. The lift cable 4, 6 is attached to the fastener element 40. The guide path 34 in the base plate 32 is occupied by the lift cable 4, 6 when the lift cable 4, 6 is tensioned and works correctly. The control element 36 is configured to be pushed by the lift cable 4, 6 to a first position when the lift cable 4, 6 extends into the guide path 34. The control element 36 according to FIG. 7 is a pin 36, comprising a helical spring element 50 having a spring force configured to be exceeded by a force from the lift cable 4, 6 when the pin 36 is pushed to the first position. When the lift cable 4, 6 is tensioned and works correctly, the lift cable 4, 6 will abut against the pin 36 and push the pin 36 to the first position. As long the pin 36 is in the first position, the switch 28 will not be actuated. The switch 28 may be an electrical micro switch. The switch 28 is arranged in a space 44 of the base plate 32. The guide path 34 comprises a circular extension 46. As shown in FIGS. 8 and 9, circular extension 46 extends along a periphery of base plate 32 along a semicircular arc. The circular extension 46 of the guide path 34 results in that the lift cable 4, 6 smoothly will follow the circular extension 46 and occupy the guide path 34 when the lift cable 4, 6 is tensioned and works correctly. The aperture 38, switch 28, and control element 36 are arranged radially inward of the circular extension 46 of the guide path 34. Since the lift cable smoothly will follow the circular extension 46 of the guide path 34, the lift cable 4, 6 will abut firmly against the pin 36, which is configured to extend through the aperture 38. Signal cables 48 of the circuit 30 are connected to the switch 28.

FIG. 9 shows a schematic cross sectional view along line III-III in FIG. 7, with a broken lift cable 4, 6. The pin 36 has been released by the lift cable 4, 6 to a second position in the event of a breakage of the lift cable 4, 6. The pin 36 is configured to actuate the switch 28 when the pin 36 has been moved to the second position and released pin 36 on the switch 28. The pin 36 has been moved to the second position by the spring element 50. The lift cable 4, 6 have left the guide path 34 and simultaneously released the pin 36 and thus actuated the switch 28. When the switch 28 is actuated, signals to the circuit 30 is initiated for stopping the motor 12.

Figure 10:
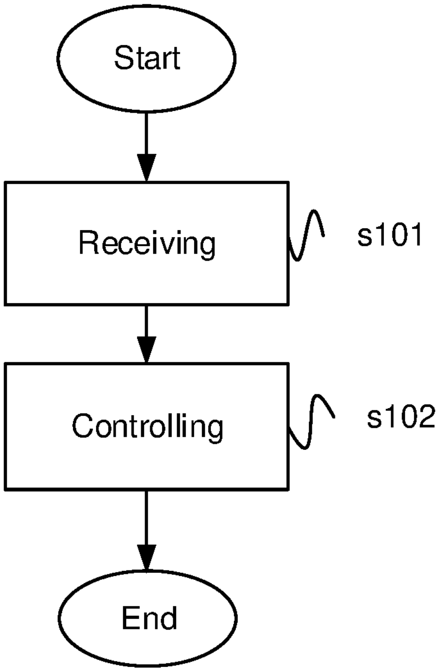
FIG. 10 illustrates a flow chart of a method according to an example.

FIG. 10 is illustrates a flow chart of a method, performed by a control device 200, for stopping a vertical moving door 2 of a vertical moving door system 100, the vertical moving door system 100 comprising: at least two lift cables 4, 6, a motor 12 and at least two corner brackets 14, 16, the at least two corner brackets 14, 16 each comprising: a base plate 32 configured to be attached to the door 2; a guide path 34 for a lift cable 4, 6 arranged in the base plate 32; and a switch 28 is arranged in the base plate 32 and configured to be actuated by the lift cable 4, 6 in the event of a breakage of the lift cable 4, 6, wherein the respective at least two lift cables 4, 6 are connected to the motor 12 and to the at least two corner brackets 14, 16 and wherein the motor 12 is configured to move the vertical moving door 2 by the at least two lift cables 4, 6 between an open and closed position O, C.

The method comprises the steps of: receiving s101 a signal from the switch 28 in the event of a breakage of the lift cable 4, 6, and controlling s102 the motor 12 to stop the movement of the vertical moving door 2.

FIG. 11 is a diagram of a version of a device 500. The control device 200, performing the method, may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for performing the safety method. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the programme stored in the memory 560 or the read/write memory 550. When the device 500 runs the programme, methods herein described are executed.

The person skilled in the art realizes that the present invention is not limited to the preferred embodiments described above. The person skilled in the art further realizes that modifications and variations are possible within the scope of the appended claims. Additionally, all aspects and embodiments of the invention could be combined with the other aspects and embodiments of the invention. Additionally, variations to the disclosed embodiments can be understood and effected by the skilled person in practicing the claimed invention, from a study of the drawings, the disclosure, and the appended claims.

The invention claimed is:

1. A corner bracket for a vertical moving door, the corner bracket comprising:

a base plate configured to be attached to the door; and a guide path for a lift cable having a circular extension and arranged along a periphery of the base plate including an aperture extending radially outward through the circular extension between opposite ends of the guide path;

a switch arranged in the base plate radially inward of the circular extension and configured to be actuated by the lift cable in the event of a breakage of the lift cable; and a control element connected with the switch at a first end and extending through the aperture, wherein an opposite end of the control element contacts the lift cable when the lift cable is disposed along the guide path.

2. The corner bracket according to claim 1, wherein the control element is configured to be pushed by the lift cable to a first position when the lift cable extends into the guide path, the control element is configured to be released by the lift cable to a second position in the event of a breakage of the lift cable, and the control element is configured to actuate the switch when the control element has been moved to the second position.

3. The corner bracket according to claim 2, wherein the control element comprises a lever adapted to extend through the aperture and a leaf spring element having a spring force configured to be exceeded by a force from the lift cable when the lever is pushed to the first position.

4. The corner bracket according to claim 2, wherein the control element comprises a pin extending through the aperture and a helical spring element having a spring force configured to be exceeded by a force from the lift cable when the pin is pushed to the first position.

5. The corner bracket according to claim 1, wherein the base plate comprises a fastener element, which is configured to attach the lift cable to the base plate.

6. The corner bracket according to claim 1, wherein the switch is an electrical micro switch.

7. A vertical moving door system comprising a vertical moving door, at least two lift cables, a motor and at least two corner brackets according to claim 1, wherein the respective at least two lift cables are connected to the motor and to the at least two corner brackets and wherein the motor is configured to move the vertical moving door by the at least two lift cables between an open and closed position (O, C).

8. The vertical moving door system according to claim 7, wherein the motor and the switch in each of the at least two corner brackets are connected to an electric circuit, and wherein the switch is actuated and configured to stop the motor in the event of a breakage of the lift cable, which is connected to the corner bracket comprising the actuated switch.

9. The vertical moving door system according to claim 8, wherein the electric circuit comprises a control device configured to receive an input signal from the actuated switch, and wherein the control device is configured to stop the motor as a response to the received input signal from the actuated switch.

10. The vertical moving door system according to claim 7, wherein a first corner bracket is arranged at a first lower side part of the door, and wherein a second corner bracket is arranged at a second lower side part of the door.

11. A method, performed by a control device, for stopping a vertical moving door of a vertical moving door system, the vertical moving door system comprising:

at least two lift cables, a motor and at least two corner brackets, the at least two corner brackets each comprising:

a base plate configured to be attached to the door;

a guide path for a lift cable having a circular extension and arranged along a periphery of the base plate including an aperture extending radially outward of the circular extension between opposite ends of the guide path;; and a switch arranged in the base plate radially inward of the circular extension and a control element connected with the switch at a first end and extending through the aperture, wherein an opposite end of the control element contacts the lift cable when the lift cable is disposed along the guide path, wherein the switches and control elements of the respective corner brackets are and configured to be actuated by the lift cable in the event of a breakage of the lift cable, wherein the respective at least two lift cables are connected to the motor and to the at least two corner brackets and wherein the motor is configured to move the vertical moving door by the at least two lift cables between an open and closed position (O, C), the method comprises the steps of:

receiving a signal from the switch in the event of a breakage of the lift cable, and controlling the motor to stop the movement of the vertical moving door.

12. A computer program comprising instructions which, when the program is executed by a computer, cause the computer to carry out the method according to claim 11.

13. A computer-readable medium comprising instructions, which when executed by a computer, cause the computer to carry out the method according to claim 11.

* * * * *